No. 782,031. PATENTED FEB. 7, 1905.
H. C. HOLTHOFF.
BARREL FILTER.
APPLICATION FILED JUNE 1, 1903.
2 SHEETS—SHEET 2.
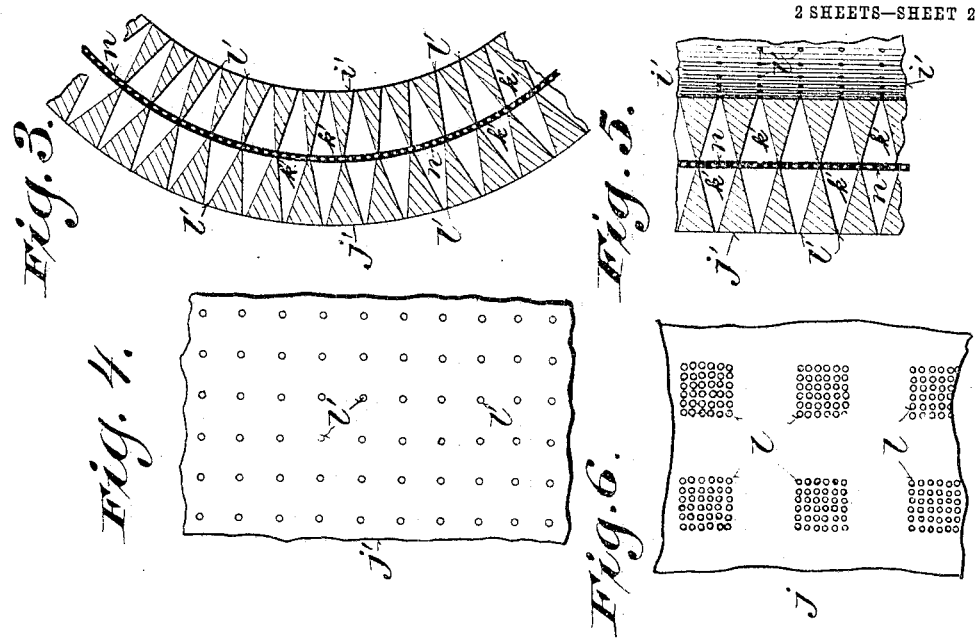
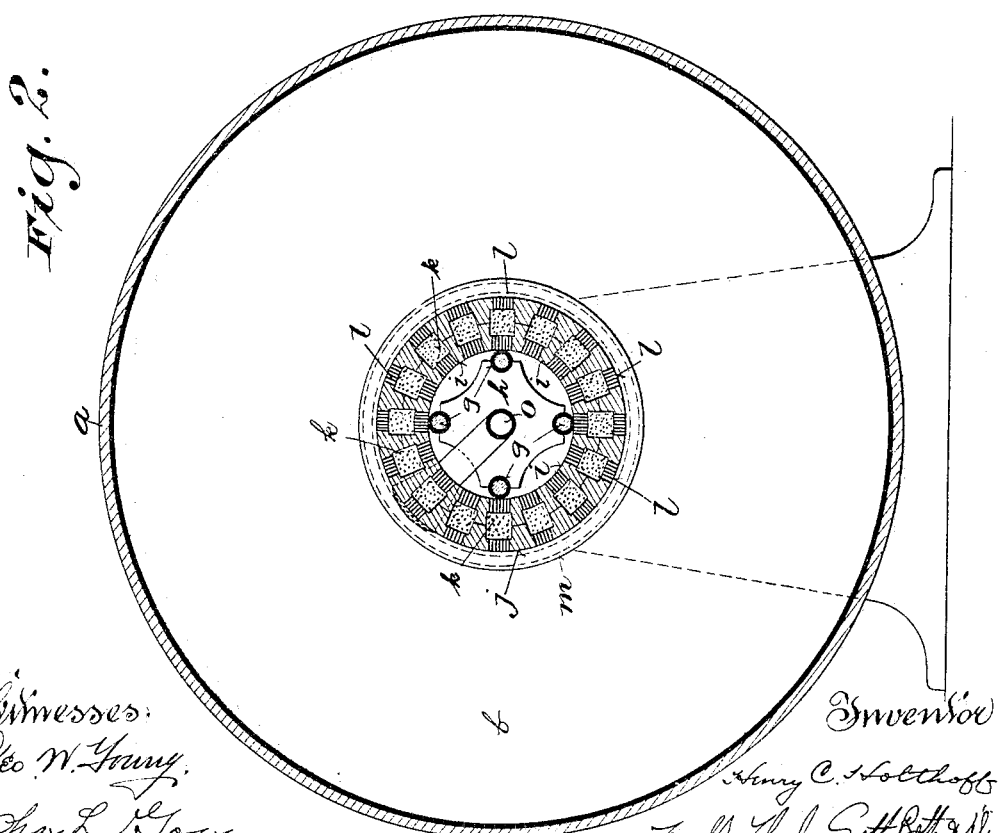

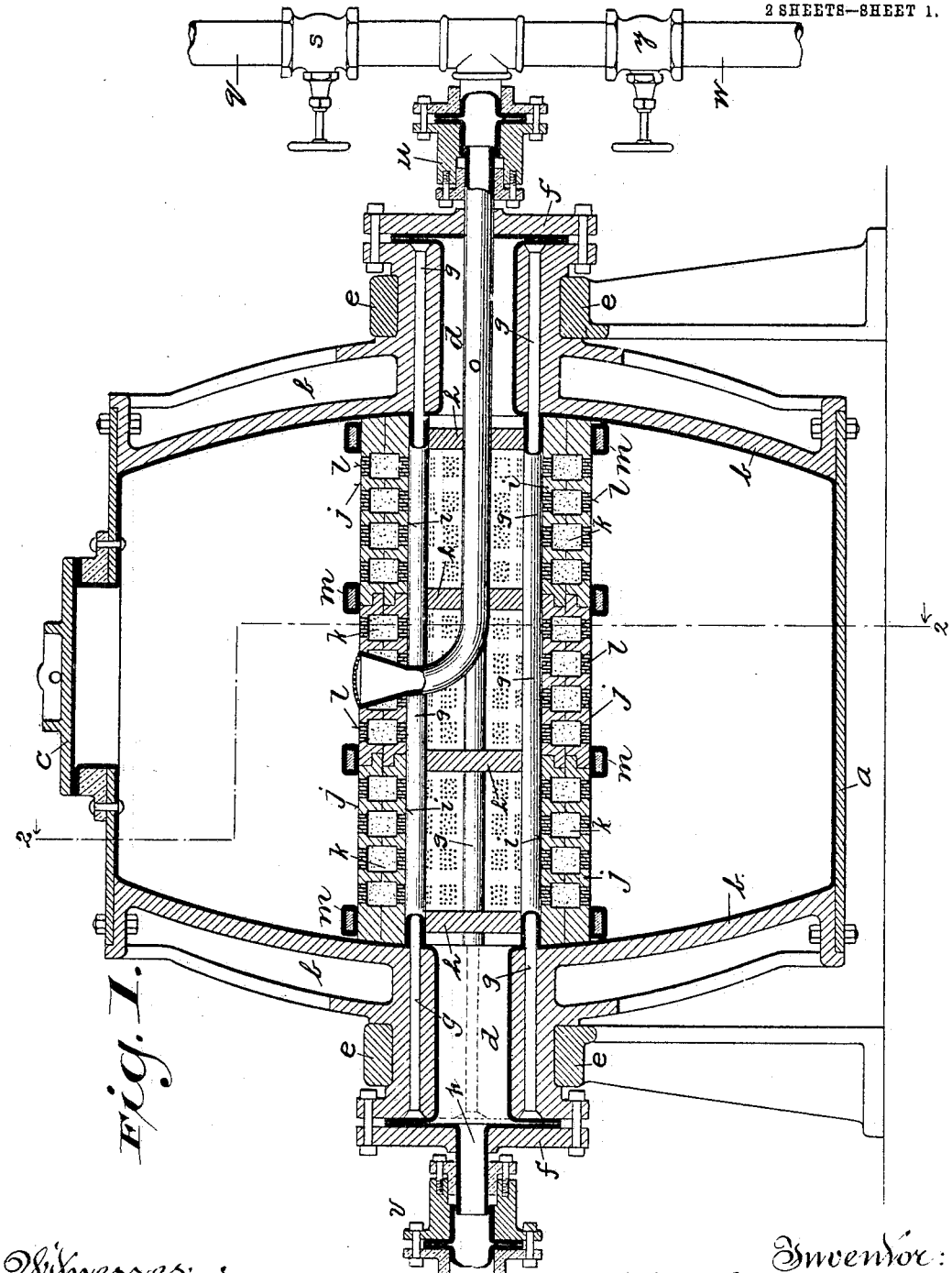

No. 782,031.

Patented February 7, 1905.

UNITED STATES PATENT OFFICE.

HENRY C. HOLTHOFF, OF MILWAUKEE, WISCONSIN, ASSIGNOR TO POWER AND MINING MACHINERY COMPANY, OF CUDAHY, WISCONSIN, A CORPORATION OF NEW JERSEY.

BARREL-FILTER.

SPECIFICATION forming part of Letters Patent No. 782,031, dated February 7, 1905.

Application filed June 1, 1903. Serial No. 159,452.

*To all whom it may concern:*

Be it known that I, HENRY C. HOLTHOFF, a citizen of the United States, residing at Milwaukee, in the county of Milwaukee and State of Wisconsin, have invented certain new and useful Improvements in Barrel-Filters, of which the following is a specification, reference being had to the accompanying drawings, forming a part thereof.

This invention relates particularly to metallurgical barrels for the chemical reduction of ores.

The main objects of the invention are to provide such a barrel with a filter arranged centrally or coaxially with relation thereto whereby the balance of the barrel is maintained and less power required to rotate it, to provide for withdrawing the liquor through the filter from a charge of ore without stopping the barrel, to increase the filtering area in a barrel of any given capacity, to prevent or diminish abrasion and wear of the filter by the ore, and generally to improve the construction and operation of this class of apparatus.

It consists in certain novel features of construction and in the peculiar arrangement and combinations of parts hereinafter particularly described, and pointed out in the claims.

In the accompanying drawings like letters designate the same parts in the several figures.

Figure 1 is a central longitudinal section of a barrel-filter embodying my invention. Fig. 2 is a cross-section of the same on the line 2 2, Fig. 1. Fig. 3 is an enlarged cross-section of a part of a modified form of the filter-frame and filter-body. Fig. 4 is an outside view, and Fig. 5 is a longitudinal section of the same; and Fig. 6 is an outside view, on an enlarged scale, of a part of the filter-frame shown in Figs. 1 and 2.

At present flat filters are usually employed in metallurgical barrels for the treatment of gold and silver ores with chlorin or other chemical solutions. These filters run lengthwise through the barrels on one side thereof, covering about one-third of the internal area of their cylindrical shells. To withdraw the liquor or solution from a charge of ore when a filter of this kind is used, the barrel is stopped with the filter at the bottom in a horizontal position. A pipe or hose leading from a compressed-air or water supply is coupled with the upper part of the barrel, and a discharge-valve in the barrel below the filter is opened. The valve in the inlet connection being then opened, air or water is forced into the barrel above the charge of ore and the liquor or solution is forced through the filter and discharged below it. A flat filter of this kind has been found objectionable for the following reasons: The filter being constructed of lead and other heavy material and located entirely on one side of the axis of the barrel unbalances the barrel and necessitates the wasteful use of power to rotate it. It is difficult to hold such a filter firmly in place. Being fastened to the shell or cylinder of the barrel, the filter is subjected to the abrasion of the ore, which is thrown with its whole weight upon it with every revolution of the barrel, thereby causing it to wear rapidly. To withdraw the liquor or solution after each charge of ore has been treated, it is necessary to stop the barrel and connect a detachable water or air supply pipe therewith, and unless a similar connection is made for conducting off the liquor or solution the fumes given off by the solution are suffocating.

To obviate these objections incident to the use of a flat filter and to attain the objects hereinbefore stated is the purpose of the present invention.

Referring to the accompanying drawings and particularly to Figs. 1 and 2, *a* is a rotary barrel, which may be conveniently constructed of a shell or cylinder of sheet iron or steel, bolted to cast-iron heads *b*. It is provided on one side with a charging-opening having a removable cover *c*, and the heads are formed with hollow trunnions *d*, which are supported in suitable bearings *e* and are provided at their outer ends with heads or covers *f*.

For convenience of illustration on a sufficiently large scale the barrel is shown in Fig. 1 considerably shorter than it is usually made in practice.

The barrel and such parts of the apparatus as are made of corrodible metal are protected by lead.

Surrounding the axis of the drum and extending lengthwise through the same from end to end a sectional filter-frame is supported on lead-covered longitudinal rods $g$, which are secured at their ends in the heads of the drum and are supported at intermediate points between the heads in the proper relation to each other by spreaders $h$, made of porcelain or other suitable material not affected by acids.

The filter-frame, which is of cylindrical or approximately cylindrical form, is constructed of porcelain, lead or other material not affected by acids and is composed of inner and outer shells $i$ and $j$, having in the outer side of the inner shell and in the inner side of the outer shell cavities which coincide with each other and form cells $k$, the opposite outer and inner walls of which are perforated with small holes $l$. The component shells of the filter-frame are made in segmental sections united with each other at their edges by rabbet or lapped joints, the sections being of such size that they can be readily passed through the charging-opening in the barrel and assembled therein. The sections of the frame are bound together and held in place upon the rods $g$ by steel or iron rings $m$, incased in lead. These rings may be made of any suitable shape, flat or round in cross-section, and they are preferably placed over the heads of adjoining sections and cover the circumferential joints between them.

The cavities or cells in the filter-frame may be made of different shapes—for example, approximately square or rectangular, as shown in Figs. 1 and 2, or conical or tapering, as shown in Figs. 3 and 5—and the perforations through their opposing outer and inner walls may be variously arranged.

With the form of filter-frame shown in Figs. 1 and 2 the cavities or cells are preferably filled with coarse sand, crushed silicious stone, or other suitable granular material not affected by acids, which serves as the filtering body or medium.

With the form of filter-frame shown in Figs. 3, 4, and 5 a filtering body or medium consisting of a finely-perforated sheet $n$, of lead or other material not affected by acids, may be interposed between the inner and outer shells $i'$ and $j''$, as shown in Figs. 3 and 5, but the filter-frame may be constructed in various ways of various materials and any suitable material may be employed therewith as the filtering body or medium within the intended scope of my invention. In the form last mentioned the tapering cavities $k'$ terminate on the outer and inner sides of the filter-frame in single perforations $l'$.

$o$ is a lead pipe passing centrally through one of the trunnions of barrel $a$ and bent laterally at its inner end, which passes through one side of the filter-frame and communicates with the interior of the barrel.

$p$ is a lead pipe secured centrally in the head or cover of the other trunnion, through which it communicates with the interior of the filter.

$q$ and $r$ are stationary pipes at opposite ends of the barrel leading from a water or compressed-air supply. They are provided with valves $s$ and $t$ and are connected with the outer ends of the rotary pipes $o$ and $p$ through couplings and stuffing-boxes $u$ and $v$. Pipes $w$ and $x$, provided with valves $y$ and $z$, are also connected by the couplings and stuffing-boxes $u$ and $v$ with the pipes $o$ and $p$.

My improved barrel-filter operates as follows: A charge of ore being placed therein, with the materials for producing the solution to dissolve the metal in the ore, and the cover $c$ and the valves $s$, $t$, $y$, and $z$ being closed, the barrel is rotated by any suitable driving connection (not shown) until the charge has been subjected sufficiently to the action of the solution. The solution is then drawn off and filtered without necessarily stopping the barrel by opening the valves $s$ and $z$. Water or air under pressure being thus admitted through the pipe $o$ into the barrel outside of the filter forces the liquid contained therein through the filter and discharges it at one end thereof through the pipes $p$ and $x$. The solution, more or less diluted, may be completely removed from the barrel either when it is at rest or in motion by the introduction of water or it may be nearly if not completely discharged from the barrel while rotating by the introduction of compressed air. In case the filter becomes clogged and it is necessary or desirable to clean it the valves $t$ and $y$ are opened, the valves $s$ and $z$ being closed, and the flow of liquid through the filter is reversed.

It will be observed that in the operation of the filter hereinbefore described the filter by reason of its form and central location in the barrel is not subjected to the weight and but slightly to the abrading action of the tumbling charge of ore, thereby avoiding rapid wear and deterioration of the filter elements, and that the filter so arranged does not destroy the balance of the barrel and necessitate the employment of excessive power to run it.

When the liquor or solution is drawn off after a charge of ore has been treated therewith, it is unnecessary to stop the barrel or interrupt its operation or to temporarily connect a water or compressed-air supply pipe therewith. By simply opening two valves the liquid contained in the barrel is forced therefrom through the filter, which has an extended effective area, making it possible to discharge the barrel quickly and being discharged from the barrel through permanent fluid-tight pipe connections suffocating fumes of chlorin or other noxious gases, vapors, or odors are not allowed to escape.

Various changes other than those hereinbefore specifically mentioned in the details of construction and arrangement of parts of the apparatus may be made within the principle and intended scope of my invention.

I claim—

1. In a barrel-filter the combination of a rotary barrel having a hollow trunnion and a valve-controlled pipe connection with said trunnion, and an approximately cylindrical filter, composed of a perforated cellular filter-frame and an interposed filtering body or medium arranged axially within said barrel and communicating inside with said trunnion, substantially as described.

2. In a barrel-filter, an approximately cylindrical cellular filter-frame composed of detachable and separately-removable sections, substantially as described.

3. In a barrel-filter the combination with a rotary barrel provided with a charging-opening and removable cover, of an approximately cylindrical filter-frame composed of segmental sections of a size that can be inserted and removed through said opening, substantially as described.

4. In a barrel-filter the combination of a rotary barrel having hollow trunnions and a charging-opening provided with a removable cover, of an approximately cylindrical filter-frame arranged axially within said barrel and consisting of inner and outer concentric cellular shells which are composed of sections of a size that will pass through said charging-opening, substantially as described.

5. In a barrel-filter the combination of a rotary barrel provided with longitudinal rods and an approximately cylindrical filter composed of sections which are supported by said rods within said barrel around its axis, substantially as described.

6. In a barrel-filter the combination with a rotary barrel provided with longitudinal rods secured at the ends in the heads of the barrel, spreaders supporting the rods between the heads, and a filter supported by said rods around the axis of the barrel, substantially as described.

7. In a barrel-filter the combination of a rotary barrel provided with longitudinal rods, a filter composed of segmental sections supported by said rods around the axis of said barrel, and rings surrounding said filter and holding its sections in place on said rods, substantially as described.

8. In a barrel-filter the combination with a rotary barrel of an approximately cylindrical perforated cellular filter-frame made in separately-removable sections of non-corrosive material and arranged axially within said barrel, substantially as described.

9. In a barrel-filter the combination with a rotary barrel, of an approximately cylindrical filter-frame composed of inner and outer shells having coinciding cavities or cells in the inside of the outer shell and in the outside of the inner shell, and perforations through the outer and inner walls of said cavities or cells, substantially as described.

10. In a barrel-filter the combination with a rotary barrel, of an approximately cylindrical filter-frame composed of inner and outer shells having coinciding cavities or cells and perforations in the inner and outer walls of said cavities or cells, and a filter-body interposed between said shells, substantially as described.

11. In a barrel-filter the combination with a rotary barrel, of a filter-frame composed of inner and outer shells having coinciding cavities and perforations in the inner and outer walls of said cavities, said cavities being supplied with non-corrosive granular filtering material, substantially as described.

12. In a barrel-filter the combination with a rotary barrel of an approximately cylindrical filter-frame arranged axially within said barrel and composed of sectional inner and outer shells having coinciding cells and perforations in the inner and outer walls of said cells, and a suitable filter-body interposed between said shells, substantially as described.

13. In a barrel-filter the combination with a rotary barrel of an approximately cylindrical filter-frame arranged axially within said barrel and composed of sections forming when assembled, lapping joints, substantially as described.

In witness whereof I hereto affix my signature in presence of two witnesses.

HENRY C. HOLTHOFF.

Witnesses:
  CHAS. L. GOSS,
  ALICE E. GOSS.